No. 734,847.

Patented July 28, 1903.

UNITED STATES PATENT OFFICE.

JOSEPH WILLIAM GARRICK, OF BINGHAMTON, NEW YORK.

PROCESS OF RAISING DOUGH.

SPECIFICATION forming part of Letters Patent No. 734,847, dated July 28, 1903.

Application filed May 22, 1902. Serial No. 108,579. (No specimens.)

*To all whom it may concern:*

Be it known that I, JOSEPH WILLIAM GARRICK, a citizen of the United States, residing at Binghamton, in the county of Broome and State of New York, have invented certain new and useful Improvements in Processes for Raising Dough; and I do declare the following to be a full, clear, and exact description of the invention, such as will enable others skilled in the art to which it appertains to make and use the same.

The invention relates to a new process for raising dough for the production of bread, biscuits, rolls, and cakes, and has for its object the reduction in the expense, time, and labor involved in the making of the dough and the production of a more healthsome product.

With this object in view the invention consists principally in fermenting what is known to the art as "liquor" before the flour is incorporated. The liquor thus being in an active state of fermentation and pregnant with carbonic-acid gas acts at once upon the gluten cells, causing them to expand. This "liquor," so called, is the mixture resulting from the incorporation with the liquid to be used (water, milk, or both, as desired) of the sugar, molasses, malt extract, glycerin, or saccharin for the batch.

I carry out the process as follows: I take the desired amount of yeast to be used and dissolve or mix it into one-third of the amount of liquid to be used, with the full amount of sugar, molasses, malt extract, glycerin, or saccharin for the whole batch. Let the liquor thus obtained remain at rest in a closed vessel from five minutes to four hours at a temperature of from 60° to 106° Fahrenheit, or until it has fermented and developed alcohol and generated carbonic-acid gas resulting from the fermentation. Then add this one-third of fermented liquor to the other two-thirds of the liquid, and then add the shortening in a melted condition. Let the entire mass remain at rest from thirty to ninety minutes at a temperature of from 90° to 70°, then add the salt, dissolved, and let it stand for five minutes, then incorporate the flour, and mix until clear and rest until ready.

It has been demonstrated that by this process the same amount of dough will be fermented in the same time by the use of one-third the yeast as used heretofore, while, on the other hand, if the full amount of yeast is used the batch of dough will be ready from sixty to ninety minutes earlier than by the method heretofore in vogue, or by employing this process with the full amount of yeast the dough made from weak flour will be ready much sooner and may be set at any temperature and be ready in the same time as if it were set at an excessive temperature, thereby preventing too much decay in the gluten and hence preserving the principles of nutrition.

Having thus described my invention, what I claim, and desire to secure by Letters Patent, is—

The herein-described process of preparing dough, consisting in adding yeast to a liquor containing saccharine matter and capable of fermentation, causing the same to ferment, diluting the fermented liquor with the entire quantity of liquid to be used, causing said liquor to remain at rest for a period of from thirty to ninety minutes at a temperature of from 70° to 90°, and subsequently incorporating the flour.

In testimony whereof I have hereunto set my hand in presence of two subscribing witnesses.

JOSEPH WILLIAM GARRICK.

Witnesses:
   JOSEPH P. MANGAN,
   AMELIA PUGH.